United States Patent

Stern

[15] 3,701,368
[45] Oct. 31, 1972

[54] FABRICATION OF LIQUID CRYSTAL DEVICES

[72] Inventor: Herman Abraham Stern, Somerville, N.J.

[73] Assignee: RCA Corporation
[22] Filed: June 23, 1971
[21] Appl. No.: 155,845

[52] U.S. Cl...........................................141/1, 141/8
[51] Int. Cl..............................B65b 1/04, B65b 3/04
[58] Field of Search.....178/7.7; 350/160; 141/1, 4–8

[56] References Cited

UNITED STATES PATENTS 2,141,644  12/1938  Eddison.........................141/8

Primary Examiner—Houston S. Bell, Jr.
Attorney—Glenn H. Bruestle

[57] ABSTRACT

During device filling, as by flowing the liquid crystal material through ports opening into opposite ends of the device, the walls of the device are caused to alternately outwardly bow and inwardly collapse to cause variations in the paths of flow of the material through the device.

5 Claims, 5 Drawing Figures

INVENTOR.
HERMAN A. STERN
BY M.Y. Epstein
ATTORNEY

FABRICATION OF LIQUID CRYSTAL DEVICES

BACKGROUND OF THE INVENTION

This invention relates to liquid crystal devices.

One type of liquid crystal device comprises a pair of oppositely disposed substrates sandwiching a thin film of liquid crystal material therebetween. Disposed on the inner surfaces of the substrates are one or more electrodes.

With one type of liquid crystal material, the thin film of material is normally transparent to light, and the film, optimally, is substantially invisible to the viewer. When a voltage is applied through the film, via the device electrodes, the portions of the liquid crystal film between the electrodes become light scattering.

One problem in the past has been that, with no voltage applied to the device, the entire extent of the liquid crystal material film is often not uniformly transparent to light. Rather, present in the film, and being disposed randomly relative to the position of the device electrodes, are irregularly shaped patches or regions which are partially scattering of light. The presence of these patches detracts from the intended display.

DESCRIPTION OF PREFERRED EMBODIMENTS OF THE INVENTION

Figures 1, 2, 3, 4, 5:
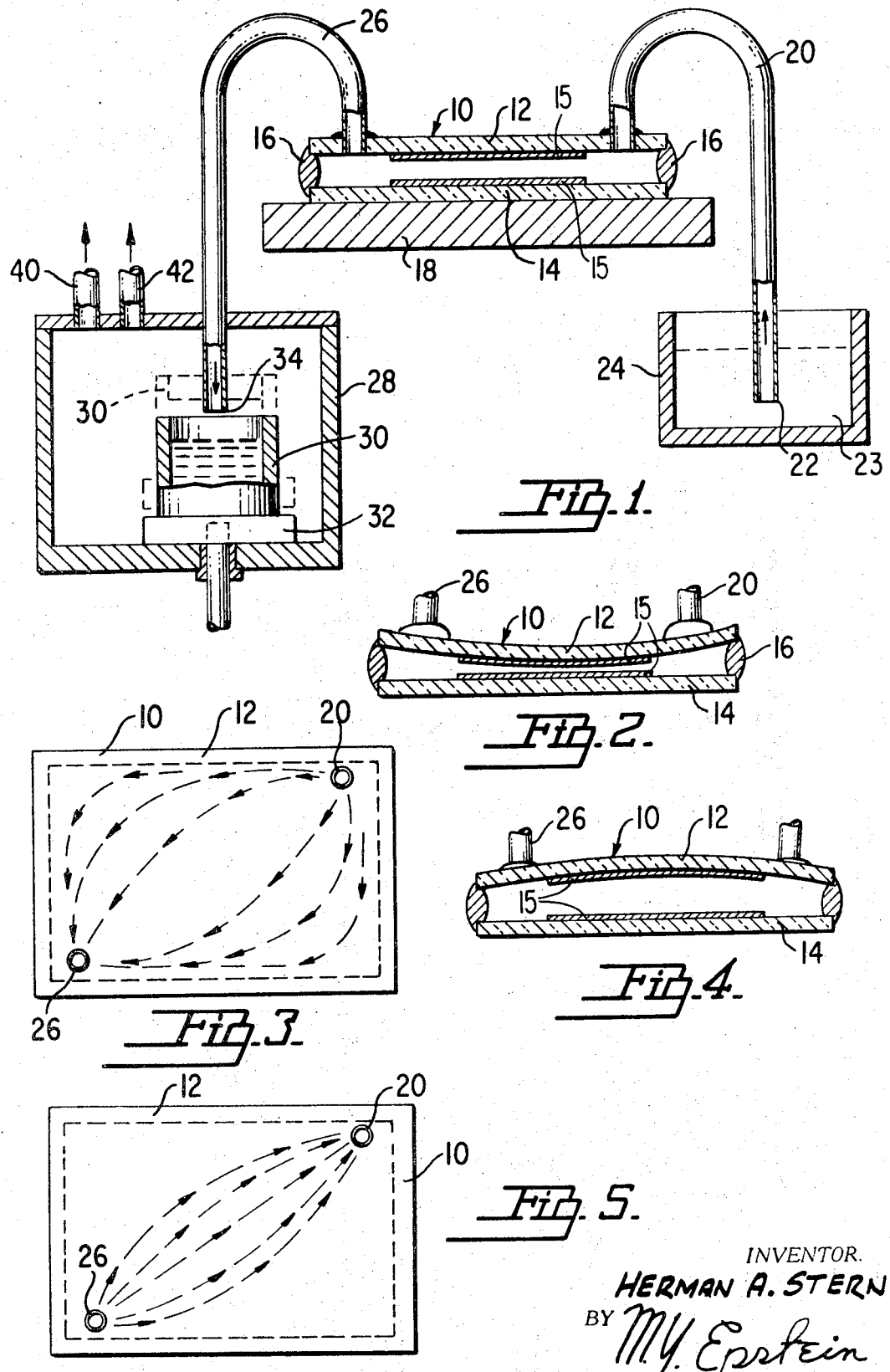
FIG. 1 is a schematic view of apparatus for filling a liquid crystal cell with liquid crystal material in accordance with the process of this invention.
FIG. 2 is a sectional view of the cell during one part of the filling process.
FIG. 3 is a front view of the cell during said one part of the process.
FIGS. 4 and 5 are views similar to those of FIGS. 2 and 3, respectively, but showing the cell at a different part of the filling process.

The theory concerning the operation of liquid crystal devices is generally known, see for example, U.S. Pat. Nos. 3,499,112, issued Mar. 3, 1970 to Heilmeier, et al., and 3,322,485 issued May 30, 1967 to Williams. In general, the thin film of liquid crystal material is transparent owing to the alignment of optical domains of the material in the direction of light through the device. When the axes of the domains are rotated, as by an electric field, or when turbulence is introduced within the material, as by the passage of an electrical current therethrough, the material becomes light scattering.

In one form of liquid crystal device, such as that shown in FIG. 1, the device 10 comprises a pair of oppositely disposed substrates 12 and 14 of, e.g., glass, maintained and sealed together in spaced apart relation by a shim 16 of, e.g., a glass frit, disposed between the substrates near the outer edges thereof. Electrodes 15, of, e.g., tin oxide, are provided on the inside surfaces of the substrates.

A thin, e.g., one-half mil thick, film of liquid crystal material is contained between the substrates. The thin film of liquid crystal material can be either normally transparent to light, and rendered light scattering when a voltage is applied across the film, or it can be normally light scattering and rendered transparent when the voltage is applied.

Considering the normally transparent liquid crystal material, it is found that by merely filling the liquid crystal "cell," i.e., the container provided by the spaced apart substrates 12 and 14 and the shim 16, proper alignment of the optical domains of the liquid crystal material usually occurs. Thus, the liquid crystal film is normally uniformly transparent to light. A problem, as previously noted, is that occasionally, with no obvious pattern or reason, portions or patches of the liquid crystal film are not transparent but appear slightly "cloudy," i.e., the portions are slightly scattering of light.

It presently appears that the presence of these cloudy patches is related to variations in the composition of the liquid crystal material at the interface of the material with the substrate surfaces. The various liquid crystal materials presently used, see, for example, the aforementioned U.S. patents, are rather complex solutions of various ingredients. While not known for certain, it appears that a preferential wetting of the substrate surfaces by certain ones of the ingredients of the liquid crystal material occurs upon the filling of the cell, whereby these certain ingredients can be "stripped" from the material. That is, during the filling of the cell with the liquid crystal material, as by flow of the material through the cell from end to end thereof, the composition of the liquid crystal end material can vary depending upon the extent of contact of the material with the substrate surfaces. The alignment of the optical domains is believed to be affected by this variation in the liquid crystal material composition.

The above theory, it is noted, is not particularly "suggested" by the pattern of patches observed in various devices. For example, the observed patterns of patches in the cells do not have any particular cell end-to-end configurations.

It has been discovered that by flushing the cell thoroughly with the liquid crystal material, as by emptying a filled cell and then refilling it, the incidence of patches is reduced. Apparently, by the prior wetting of the substrate surfaces with the "original" liquid crystal material, saturation of the substrate surfaces occurs and the amount of stripping of the various ingredients from the later introduced "fresh" material is significantly reduced, whereby good alignment results. Merely repeatedly refilling the cell, or using continuous flushing techniques in accordance with one prior art filling processes, appears, however, to only partially solve the problem. The reason for this, I have discovered, is as follows.

According to one prior art cell filling technique, not illustrated herein, the cell is provided with two tubulations (see FIGS. 1 and 3 with respect to the cell configuration, which is not changed by the instant invention) disposed at diagonal corners of the device, each tubulation extending through the substrate to which it is attached and opening into the space within the cell. One of the tubulations extends to and has its open end immersed in a reservoir of the liquid crystal material, the reservoir being open to the air. The other tubulation is connected to a source of vacuum. By drawing a vacuum through the cell, the liquid crystal material is drawn from the reservoir into the cell. To prevent extensive inward bowing of the two substrates, especially at the central portions of large area cells, the cell itself is also disposed within an evacuated chamber.

A problem with this process is that, owing to such factors as variations in the thickness or flatness of the cell substrates, tilt of the substrates relative to one another, or the like, it often occurs that the spacing between the substrates at various regions within the cell is so small and constricted as to seriously impede the flow of the liquid crystal material through these regions. This is more readily understood considering that the nominal spacing between the substrates is generally in the order of one-half mil. Thus, even with repeated fillings or flushing of the cell, the substrate surfaces at these regions of constricted or reduced cross-sectional area are not so completely "scrubbed" or wetted by the material as to eliminate the stripping problem.

While extensive flushing or repeated filling of the cell might eventually result in patch-free devices, the time involved in these processes is extensive, thereby adding expense to the device.

A solution, I discovered, is not to try to avoid the presence of these constricted regions, as by disposing the cell within an evacuated chamber, or the like, but rather to accentuate the formation of such constricted regions, but in an alternating manner. For example, during the cell filling process, portions of the cell walls are deliberately caused to inwardly bow or collapse, thus giving rise to the presence of constricted regions of the cell at these portions. The flow of the liquid crystal material thus favors the other, non-constricted regions, thereby tending to thoroughly wet and "scrub" the substrate surfaces at these regions. Then, by causing the previously constricted regions to expand in cross-sectional area to an even greater than normal size, as by outwardly bowing the wall portions thereof, the flow of the liquid crystal material then favors the expanded regions. Thus, these regions are thoroughly wetted.

One means for accomplishing this process is illustrated in FIG. 1. As shown, the cell 10 is disposed on a support plate 18. The cell is not enclosed within an evacuated chamber but is exposed to the ambient air. The remote open end 22 of one tubulation 20 of the cell extends to and is immersed within a body 23 of the liquid crystal material within a container 24 open to the air. The other tubulation 26 of the cell extends into, in hermetically sealed relation, a pressure chamber 28. Within the chamber 28 is a second container 30 of the liquid crystal material. The container 30 rests on a vertically movable platform 32 disposed directly beneath the open end 34 of the tubulation 26 within the chamber 28. In the platform down position, as shown in solid lines in FIG. 1, the tubulation open end 34 is not immersed in the liquid crystal material. In the platform up position, as shown in dashed lines in FIG. 1, the open end 34 of the tubulation 26 is so immersed.

Communicating with the interior of the chamber 28, via tubulations 40 and 42, are a means for drawing a vacuum and a source of air pressure, respectively.

In operation, the chamber 28 is first evacuated with the platform 32 in the down position. Since the tubulation 26 is not immersed in the liquid crystal material, this causes evacuation of the cell 10 and the tubulation 20, resulting in the flow of the liquid material from the container 24 into the cell 10. Since the cell 10 is exposed to the ambient air, evacuation of the cell also causes some inward bowing of the substrate 12, the resulting reduction in the spacing between the substrates 12 and 14 being the greatest in the central regions of the cell, as shown in FIG. 2. The actual amount of bowing depends upon the dimensions of the cell and the pressure differential. In some cases, the substrates of the cell actually touch one another at the center of the cell. The spacing between the substrates at the periphery of the cell, adjacent to the spacer shim 16, is relatively unaffected, and the preferred flow paths of the liquid crystal material are circuitous ones, as shown by the arrows in FIG. 3. Allowing the liquid crystal material to flow continuously through the cell 10 for a short period of time thus results in a thorough "scrubbing" or wetting of the peripheral regions of the substrate surfaces.

Then, the vacuum is discontinued, the platform 32 is raised, thus immersing the end 34 of the tubulation 26 in the liquid in the container 30, and the chamber 28 is pressurized, e.g. to an air pressure of around 9 psi above atmospheric, more or less air pressure being used dependent upon the cell dimensions. The pressure in the chamber 28 thus causes a reverse flow of the liquid crystal material in the container 30 through the cell and into the container 24.

The air pressure also causes a slight outward bowing of the substrate 12, as shown in FIG. 4, thereby causing enlargement of the central region of the cell 10. (Owing to the small spacing between the cell substrates 12 and 14 enough pressure drop occurs within the cell to cause the substrate bowing; otherwise a clamp, not shown, can be provided on the tubulation 20 to provide the desired cell back pressure). The preferred flow paths of the liquid crystal material are now through the cell central regions, as shown by the arrows in FIG. 5, and the flow is continued long enough to provide a complete wetting of the substrate surfaces of these regions.

The sequence of the process, i.e., whether the cell is first expanded or collapsed, is immaterial. Also, generally only one cycle is necessary.

Other means for practicing the invention, such as the use of weights or pressures applied against the outer surfaces of the cell, the use of clamps, or the like, will be obvious to persons skilled in these arts. Also, whether the same cell portions, e.g., the central portions, are caused to alternately outwardly and inwardly bow, or whether different cell portions are successively caused to either expand or contract is immaterial. That is, the results are substantially the same as long as different regions within the cell are alternately caused to expand and contract relative to one another, thus causing an alternation of the preferred flow paths of the liquid crystal material from region to region.

Further, instead of applying air pressure against the liquid crystal material in the container 30 to reverse the direction of flow, air pressure can be applied against the liquid crystal material in the container 24, thus maintaining the same flow direction. It does appear, however, that somewhat better results are obtained if the direction of flow of the liquid crystal material is reversed at least once during the pilling process.

In another embodiment of the invention, not illustrated, the container 24 shown in FIG. 1 is not exposed to the open air, but is enclosed within a chamber containing an inert gas, e.g., nitrogen. Also, the tubulation 42, connected to a source of air pressure in the FIG. 1 embodiment, is connected to a pressure source of an inert gas, e.g., nitrogen. The purpose of these changes, which do not affect the procedure in practicing the invention, is to protect the liquid crystal material from the ambient air.

I claim:

1. A process for filling a liquid crystal device container with liquid crystal material comprising:
   flowing said liquid crystal material through an opening in said container and into said container, and
   altering the flow path of said liquid crystal material within said container to cause a repeated contacting of the interior surfaces of said container by said material flowing across said surfaces in different directions.

2. A process for fabricating a liquid crystal device of the type comprising a container and a liquid crystal material therewithin, said method comprising:
   flowing the liquid crystal material through said container, and
   simultaneously with said flowing step, alternately enlarging and reducing the volume of two regions of said container relative to one another for alternating the preferred flow path of said liquid crystal material from region to region.

3. The process as in claim 2, wherein a wall portion of said container is alternately inwardly and upwardly bowed.

4. The process as in claim 2, wherein the direction of flow of said material is reversed at least once during said process.

5. A process for fabricating a liquid crystal device of the type comprising a container and a liquid crystal material therewithin, said method comprising:
   providing two extending tubulations each having an end opening within said container in sealed relation therewith,
   immersing the opposite end of one of said tubulations in a first body of liquid crystal material,
   exhausting said container through the other of said tubulations, thereby causing flow of said material from said first body through said cell, and
   alternately with said exhausting step,
   immersing the opposite end of said other tubulation in a second body of liquid crystal material and applying pressure against said second body for causing flow of said material from said second body through said cell.

* * * * *